US009976197B2

(12) United States Patent
Okamura et al.

(10) Patent No.: US 9,976,197 B2
(45) Date of Patent: May 22, 2018

(54) METHOD FOR PRODUCING JOURNAL PART OF 9 TO 12% CR STEEL TURBINE ROTOR, AND JOURNAL PART PRODUCED BY THE METHOD (71) Applicant: JAPAN CASTING & FORGING CORPORATION, Kitakyushu-shi, Fukuoka (JP)

(72) Inventors: Yoshihiro Okamura, Kitakyushu (JP); Yasushi Wakeshima, Kitakyushu (JP)

(73) Assignee: JAPAN CASTING & FORGING CORPORATION, Fukuoka (JP)

( * ) Notice: Subject to any disclaimer, the term of this patent is extended or adjusted under 35 U.S.C. 154(b) by 515 days.

(21) Appl. No.: 14/551,708

(22) Filed: Nov. 24, 2014

(65) Prior Publication Data
US 2016/0145711 A1    May 26, 2016

(51) Int. Cl.
| C21D 9/50 | (2006.01) |
| C21D 9/00 | (2006.01) |
| C21D 1/30 | (2006.01) |
| C22C 38/00 | (2006.01) |
| C22C 38/46 | (2006.01) |
| C22C 38/44 | (2006.01) |
| C22C 38/04 | (2006.01) |
| F01D 5/02 | (2006.01) |

(52) U.S. Cl.
CPC ............... C21D 9/50 (2013.01); C21D 1/30 (2013.01); C21D 9/0068 (2013.01); F01D 5/02 (2013.01)

(58) Field of Classification Search
CPC .......... C21D 1/30; C21D 9/0068; C21D 9/50; F01D 5/02
See application file for complete search history.

(56) References Cited

FOREIGN PATENT DOCUMENTS

| CN | 1771345 A | 5/2006 | |
| JP | 55-16744 A | 2/1980 | |
| JP | 57-137456 A | 8/1982 | |
| JP | 59067313 A | * 4/1984 | ............. C21D 8/005 |
| JP | 63-248587 A | 10/1988 | |
| JP | 04-081293 A | 3/1992 | |
| JP | 06-272503 A | 9/1994 | |
| JP | 09-076091 A | 3/1997 | |
| JP | 10-006080 A | 1/1998 | |

(Continued)

OTHER PUBLICATIONS

First Notice of Reasons for Refusal dated Aug. 3, 2015, issued in counterpart Chinese Application No. 201310394504.1, With English translation (12 pages).

*Primary Examiner* — Jenny R Wu
(74) *Attorney, Agent, or Firm* — Westerman, Hattori, Daniels & Adrian, LLP (57) ABSTRACT

In a journal part of a 9 to 12 wt % Cr steel turbine rotor, a groove face is formed, and on the groove face, a lower build-up layer is formed by using a first welding material containing C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, V: 0.03 to 0.10 wt %, and a remainder composed of Fe and inevitable impurities, and further on this lower build-up layer, an upper build-up layer is formed using a second welding material containing C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, and a remainder consisting of Fe and inevitable impurities.

4 Claims, 4 Drawing Sheets (56) References Cited

FOREIGN PATENT DOCUMENTS

| | | |
|---|---|---|
| JP | 2008-093668 A | 4/2008 |
| JP | 2011-011240 A | 1/2011 |
| WO | 2004/072308 A2 | 8/2004 |

\* cited by examiner

METHOD FOR PRODUCING JOURNAL PART OF 9 TO 12% CR STEEL TURBINE ROTOR, AND JOURNAL PART PRODUCED BY THE METHOD

FIELD OF THE INVENTION

The present invention relates to a method for producing a steam turbine rotor. For example, the invention relates to a method for producing a 9 to 12% Cr steel turbine rotor achieving excellent fatigue characteristics and bond toughness of a journal part (bearing part) of the 9 to 12% Cr steel turbine rotor (high Cr steel turbine rotor), and to a journal part produced by this method.

BACKGROUND OF THE INVENTION

For a steam turbine rotor provided as a central device of thermal power generation, for example, operation reliability, in addition to high temperature resistance and high pressure resistance, is required for improving the efficiency of thermal power generation by using steam of higher temperature and higher pressure. For this reason, as a steam turbine rotor, an integrally forged rotor of a high temperature material, namely of a 12% Cr steel material having excellent high temperature creep characteristics (12% Cr steel rotor) is used.

However, the 12% Cr steel rotor is disadvantageous to a low Cr steel rotor in that a carbide compound of carbon in the lubricant oil of the journal part and Cr is generated, and the sliding characteristic is impaired. By overlay-welding low Cr steel of about 1% on the surface of the journal part of the turbine rotor (build-up welding with low alloy steel), not only the above disadvantage is eliminated, but also occurrence of damages due to seizure or galling is prevented.

Patent Document 1 (JP 55-16744 A) discloses a turbine rotor that is free from breakage of a journal part. This turbine rotor is produced by preheating a cut cylindrical surface of the turbine rotor to a temperature of 200 to 250° C., conducting multilayer build-up welding with a welding bar composed of C: 0.1 to 0.3%, Mn: 1.5 to 2.0%, Cr: 0.05 to 0.1%, Si: 0.3% or less, and 0.03% or less of P and S, and a remainder of Fe, heating to 200° C., retaining at 120° C. for 10 hours, heating the entirety to 680° C., and then cooling to 300° C. at a rate of 5° C. per hour.

Patent Document 2 (JP 57-137456 A) discloses a turbine rotor in which torsion stress occurring in a bearing part is suppressed, and the shank surface is strengthened. This turbine rotor is featured in that an alloy composed of C: 0.05 to 0.35%, Si: 0.10 to 1.00%, Mn: 0.10 to 1.00%, Mo: 0.10 to 2.00%, Cr: 0.30 to 2.80%, V: 0.05 to 0.35%, Ni: 0.50 to 4.00%, and a remainder of iron is build-up welded on the bearing part.

Patent Document 3 (JP 4-81293 A) discloses a 12% Cr steel steam turbine rotor shaft having sufficient strength without defects such as cold crack, hot crack and blowhole. In this 12% Cr steel steam turbine rotor shaft, the journal part is build-up welding metal composed of C: 0.11 to 0.17%, Si: 0.2 to 0.6%, Mn: 1.0 to 2.5%, P: 0.03% or less, S: 0.015% or less, Cr: 1.1 to 1.6%, Mo: 0.1 to 1.6%, V: 0.04% or less, and a remainder of Fe. Patent Document 3 describes production by conducting a lower build-up welding with a combination of a welding wire of low Cr and low Mo steel and a sintered flux by a submerged arc welding method, and subsequently conducting an upper build-up welding by a similar method.

Patent Document 4 (JP 6-272503 A) discloses a 5 to 13% Cr turbine rotor wherein a journal part has sufficient strength and includes little weld residual stress. This 5 to 13% Cr turbine rotor is produced by subjecting the journal part of the turbine rotor to a lower build-up welding with a carbon steel welding material, followed by an upper build-up welding with a low alloy steel welding material containing small amounts of Cr, Ni and Mo.

Patent Document 5 (JP 9-76091 A) discloses a method for build-up welding of a bearing part of a 12% Cr steel turbine rotor having high levels of fatigue strength and seizure resistance, and preventing occurrence of a microscopic weld defect. In this build-up welding method, on the lower side of the contact face of the 12% Cr steel turbine rotor with the bearing, a lower build-up layer side is welded with a welding material containing C: 0.03 to 0.2%, Si: 0.2 to 2.0%, Mn: 0.5 to 3.0%, Ni: 3.0% or less, Cr: 1.0 to 4.0%, a total of 0.05 to 1.5% of at least one selected from Al, Ti and Zr, H: 3.0 ppm or less, at least one selected from Nb, V, W, Ti and Mo satisfying a certain relational expression, and a remainder of substantially Fe, and an upper build-up layer side is welded with a welding material containing C: 0.03 to 0.2%, Si: 0.2 to 2.0%, Mn: 0.5 to 3.0%, Ni: 3.0% or less, Cr: 1.0 to 2.5%, Mo: 0.1 to 1.5%, Nb: 0.05% or less, V: 0.1% or less, a total of 0.05 to 1.5% of at least one selected from Al, Ti and Zr, H: 3.0 ppm or less, and a remainder of substantially Fe.

Patent Document 6 (JP 2011-11240 A) discloses forming a bearing part of turbine rotor by using a material for build-up containing C: 0.03 to 0.2%, Si: 0.2 to 1.0%, Mn: 0.5 to 3.0%, Ni: 0.1 to 0.5%, Cr: 1.0 to 2.5%, Mo: 0.1 to 1.5%, Ti: 0.008 to 0.05%, and a remainder of Fe.

PRIOR ART

Patent Document

Patent Document 1: JP 55-16744 A
Patent Document 2: JP 57-137456 A
Patent Document 3: JP 4-81293 A
Patent Document 4: JP 6-272503 A
Patent Document 5: JP 9-76091 A
Patent Document 6: JP 2011-11240 A

SUMMARY OF THE INVENTION

Technical Problem

However, in the art described in Patent Document 1, ferrite is likely to occur in the weld bond part (hereinafter, simply called bond part), and this entails the problem of insufficient toughness and fatigue strength of the bond part. In the art described in Patent Document 2, a build-up welding is not conducted separately for the lower layer and the upper layer. This also has a problem that the strength of the joint of the bond part cannot be ensured because of a small amount of Mn acting as a deacidification material.

In the art of Patent Document 3, the above alloy is used for build-up layers including three or more layers rather than preparing the first layer as a lower build-up layer and distinguishing the second and subsequent layers from an upper build-up layer. Further, since the amount of V is small, a ferrite layer is likely to occur in the bond part, and the toughness can be impaired.

In the art described in Patent Document 4, pure iron or low alloy steel in which Mn or the like is added to iron is used for a lower build-up layer. However, since the metal of the turbine shaft of 12% chromium is diluted in this part, there is a problem that a part that is partially weak in strength is formed in an intermediate layer.

In the art of Patent Document 5, at least one of Al, Ti and Zr that acts as a deacidification material is added to a welding material. However, when build-up welding is carried out by submerged arc, peelability of slag is impaired, and the slag is likely to be involved in the multilayer build-up welded part.

However, Patent Document 6 describes that welding is conducted by TIG welding for the fear of occurrence of involvement of slag by submerged arc welding, and hence has different intent from the present application. Further, in TIG welding, V is not contained in the welding material also because penetration is shallow and the weld metal is unlikely to be diluted by the base material.

The present invention was devised in light of the aforementioned circumstances, and an object of the present invention is to provide a method for producing a 9 to 12% Cr steel turbine rotor having enhanced strength of deposited metal that is welded to a journal part, and improved fatigue characteristics and bond toughness of a bond part, and a journal part of a 9 to 12 wt % Cr steel turbine rotor produced by this method.

Solution to Problem

A method for producing a 9 to 12 wt % Cr steel turbine rotor according to the first aspect of the present invention in conformity with the above object includes:

a first step of forming a groove face in a region corresponding to a journal part of the 9 to 12 wt % Cr steel turbine rotor;

a second step of forming, on the groove face, a lower build-up layer by monolayer build-up welding using a first welding material containing C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, V: 0.03 to 0.10 wt %, and a remainder composed of Fe and inevitable impurities containing P: 0.015 wt % or less and S: 0.010 wt % or less;

a third step of forming, on the lower build-up layer, an upper build-up layer by multilayer build-up welding using a second welding material containing C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, and a remainder composed of Fe and inevitable impurities containing P: 0.015 wt % or less and S: 0.010 wt % or less; and a fourth step of conducting a stress removing heat treatment on the journal part formed with the upper build-up layer, wherein V is contained in the % by weight in the first welding material for welding the lower build-up layer, to suppress generation of a ferrite structure in deposited metal in the vicinity of the bond part after removal of stress, and to promote generation of uniform tempered martensite structure and bainite structure.

Preferably, in the method for producing a 9 to 12 wt % Cr steel turbine rotor according to the first aspect of the invention, Mn contained in the first welding material ranges from 1.25 to 2.5 wt %.

Preferably, in the method for producing a 9 to 12 wt % Cr steel turbine rotor according to the first aspect of the invention, after the stress removing heat treatment in the fourth step, a machining process is conducted, and further a rolling process is conducted on the part where the stress removing heat treatment is conducted for reducing the residual stress.

Advantageous Effects of Invention

According to the present invention, it is possible to produce a 9 to 12% Cr steel turbine rotor having enhanced strength of deposited metal that is welded to a journal part, and improved fatigue characteristics and bond toughness of a bond part.

BRIEF DESCRIPTION OF THE DRAWINGS

FIGS. 4A and 4B are microscopic structure photographs of a bond part and its vicinity, is the bond part being build-up welded to the 9 to 12% Cr steel turbine rotor produced by the same production method, and explanatory diagrams thereof.

DETAILED DESCRIPTION OF PREFERRED EMBODIMENTS

Hereinafter, preferred embodiments of the present invention will be described with reference to the drawings for better understandings of the present invention. In each drawing, depicturing of the part that is irrelevant to the description is occasionally omitted. The percentage (%) of metal in the composition is represented in % by weight (wt %).

The present inventors made experiments in various welding conducting conditions combining a composition of weld deposited metal added to the journal part from the welding material by welding, a welding method, a subsequent stress removing heat treatment and so on. As a result, the inventors found that by particularly containing a small amount of alloy component such as Ni or Cr in the weld deposited metal of the inner layer of the journal part, and further containing a small amount of V component, it is possible to suppress ferrite structure that is likely to occur as a result of deposition of Cr carbide and reduction of matrix metal C in the bond part (the boundary part between the weld deposited metal part and the raw material of the turbine rotor serving as a base material), and to produce a 9 to 12% Cr steel turbine rotor having high fatigue characteristics and high bond toughness.

Hereinafter, the method for producing a 9 to 12% Cr steel turbine rotor 10 (see FIG. 1) according to one embodiment of the present invention obtained by the above finding will be described in detail for each step.

(Step P1)

Molten steel smelted into a composition of 9 to 12% Cr steel that is generally used in an electric furnace or in other melting furnace is casted into a steel ingot. Then the casted steel ingot is forged into the shape of a turbine rotor. A refining heat treatment is conducted on the raw material for the 9 to 12% Cr steel turbine rotor that is formed into the shape of product by forging.

(Step P2)

Figure 2:
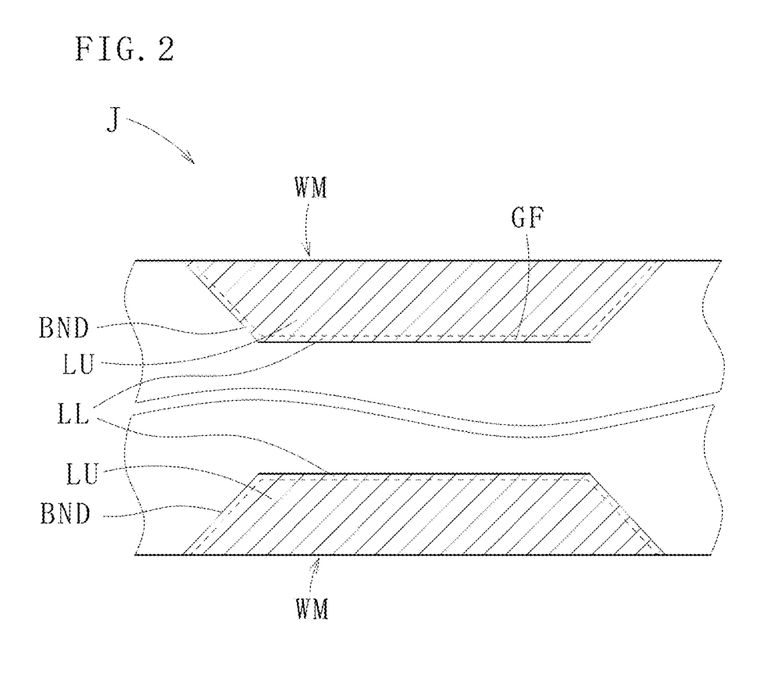
FIG. 2 is an explanatory diagram showing a cross section of a journal part of the 9 to 12% Cr steel turbine rotor produced by the same production method.

The part corresponding to a journal part J of the 9 to 12% Cr steel turbine rotor in the raw material that is formed into the shape of product is cut by a predetermined amount to form a groove face GF along the outer peripheral face (see FIG. 2). That is, the groove face GF is formed in the region corresponding to the journal part in the raw material for the 9 to 12% Cr steel turbine rotor. It is desired that the groove face GF is formed by machinery cutting.

(Step P3)

On the groove face GF of the journal part J finished into a beautiful weld surface, a monolayer build-up welding is conducted with a first welding material (weld deposited metal) limited to a predetermined composition by a submerged arc welding method or an inert gas arc welding method.

By the monolayer build-up welding using the first welding material containing a small amount of V, it is possible to suppress dilution of Cr from the raw material (base material of high Cr), and to suppress the ferrite structure that is likely to occur as a result of deposition of Cr carbide and reduction in matrix metal C.

The weld deposited component added from the first welding material by welding is able to increase the fatigue strength, toughness of the bond part BND, and resistance to weld crack sensitivity.

By the monolayer build-up welding, a lower build-up layer LL is formed on the groove face GF.

Here, as will be described later, the first welding material contains C, Si, Mn, Ni, Cr, Mo, and V.

C is a useful component from the view point of ensuring the strength of the journal part J. However, when the content of C is less than 0.10%, sufficient strength is not obtained. On the contrary, when C is contained excessively at over 0.25%, Cr carbide is deposited in the bond part BND, resulting in deterioration in the bond toughness and increased weld crack sensitivity.

Therefore, the content of C is preferably limited to 0.10 to 0.25%.

Si is contained at 0.20% or more as a component effective for increasing the fluidity of the weld molten metal added from the first welding material by welding, to suppress welding defects such as blowhole or slag involvement. However, when Si is excessively contained at over 0.80%, the bond toughness is deteriorated similarly to the case where C component is excessively contained.

Therefore, the content of Si is preferably limited to 0.20 to 0.80%.

Mn is a component effective for ensuring the joint strength of the bond part BND, and is required to be contained at 1.0% or more. However, when Mn is contained excessively at over 2.5%, the problems of deterioration in the bond toughness and increased weld crack sensitivity arise similarly to the case where C component is excessively contained.

Therefore, the content of Mn is preferably limited to 1.0 to 2.5%. For obtaining more excellent weld metal, the content of Mn is preferably 1.25 to 2.5%.

Ni is a component effective for improving the strength and toughness of the bond part BND. For achieving this, it is necessary that Ni is contained at 0.4% or more. On the contrary, when Ni is contained excessively at over 1.0%, the weld crack sensitivity increases, and the bond toughness is saturated. Containing Ni excessively is wasteful also in economical aspect.

Therefore, for obtaining intended toughness of the bond part BND of the present embodiment, it is preferred to limit the content of Ni to 0.4 to 1.0%.

Cr is a component contained at 1.0% or more as an effective component. Cr alone or in the molten condition of the weld deposited metal WM, binds with other element to form fine intermetallic compound particles and enhances the strength, and improves the bond toughness. However, when the content of Cr exceeds 3.0%, seizure phenomenon becomes more likely to occur in the journal part J during operation of the turbine.

Therefore, the content of Cr is preferably limited to 1.0 to 3.0%.

Mo is a component effective for increasing the strength of the bond part BND, and increasing the temper softening resistance during the stress removing heat treatment in the subsequent step P6 and keeping high strength. For exerting this effect, it is necessary that the content of Mo is 0.2% or more. However, when the content of Mo exceeds 1.5%, deterioration of bond toughness is caused.

Therefore, the content of Mo is preferably limited to 0.2 to 1.5%.

V is the most important component in the welding operation of the lower build-up layer LL. V is an effective component that increases the strength without reducing the toughness of the weld deposited metal WM, and suppresses generation of ferrite structure that is dominantly deposited in the bond part BND during the stress removing heat treatment in subsequent step P6 to cause generation of uniform tempered martensite structure and bainite structure. As a result, the function effect of significantly increasing the bond toughness and fatigue strength of the journal part J after the stress removing heat treatment is obtained. The function effect is obtained when the content of V component is 0.03 to 0.10%. When V is contained excessively at over 0.10%, the weld crack sensitivity increases.

Therefore, the content of V is preferably 0.03 to 0.10%. More preferably, the content of V is 0.04 to 0.08%.

The remainder of the first welding material is composed of Fe and inevitable impurities including P and S. P and S are inevitable impurities that significantly deteriorate the bond toughness. Therefore, it is preferred to reduce the contents of P and S as much as possible. Concretely, the content of P is preferably 0.015% or less. The content of S is preferably 0.010% or less.

(Step P4)

In following step P3, on the lower build-up layer LL, build-up welding of multilayer build-up (multilayer build-up welding) is conducted using the second welding material by a welding method such as the aforementioned submerged arc welding method until a predetermined outer diameter is obtained.

By conduction of the multilayer build-up welding, an upper build-up layer LU is formed on the lower build-up layer LL.

Here, as the second welding material, a welding material having a similar composition with the first welding material except for lacking V component is used to prevent occurrence of difference in strength in the part of weld deposited metal WM on the side of the lower build-up layer LL. In other words, the second welding material differs from the first welding material in that it does not contain V component. This is because dilution of Cr from the base material does not occur in the second and subsequent layers, and ferrite structure is not generated after the stress removing heat treatment.

The welding material for the upper build-up layer may contain V. In other words, the upper build-up layer may be formed by using the first welding material. When V is contained in the welding material for the upper build-up layer, it is possible to increase the strength of the weld metal part of the upper build-up layer LU.

(Step P5)

The journal part J that is outer peripherally welded in step P4 is processed by cutting into a predetermined product size (outer diameter).

(Step P6)

For recovering the fatigue characteristics and the bond toughness having decreased due to the residual stress occurring in response to the welding heat cycle of rapid heating and rapid cooling, a stress removing heat treatment at a temperature of 700° C. or less is conducted on the journal part J.

In this manner, through steps P1 to P6, a 9 to 12% Cr steel turbine rotor in which the journal part J has excellent fatigue characteristics and bond toughness is produced.

After conducting the stress removing heat treatment for the journal part, a machining process may be conducted to give a predetermined dimension. Further, after the machining, rolling may be conducted on the journal part to ameliorate the material quality of the journal part by reduction in the residual stress.

Next, various tests were conducted for the 9 to 12% Cr steel turbine rotor. Based on these tests, the function effect of the method for producing a 9 to 12 wt % Cr steel turbine rotor of the present invention will be described.

Figure 3:
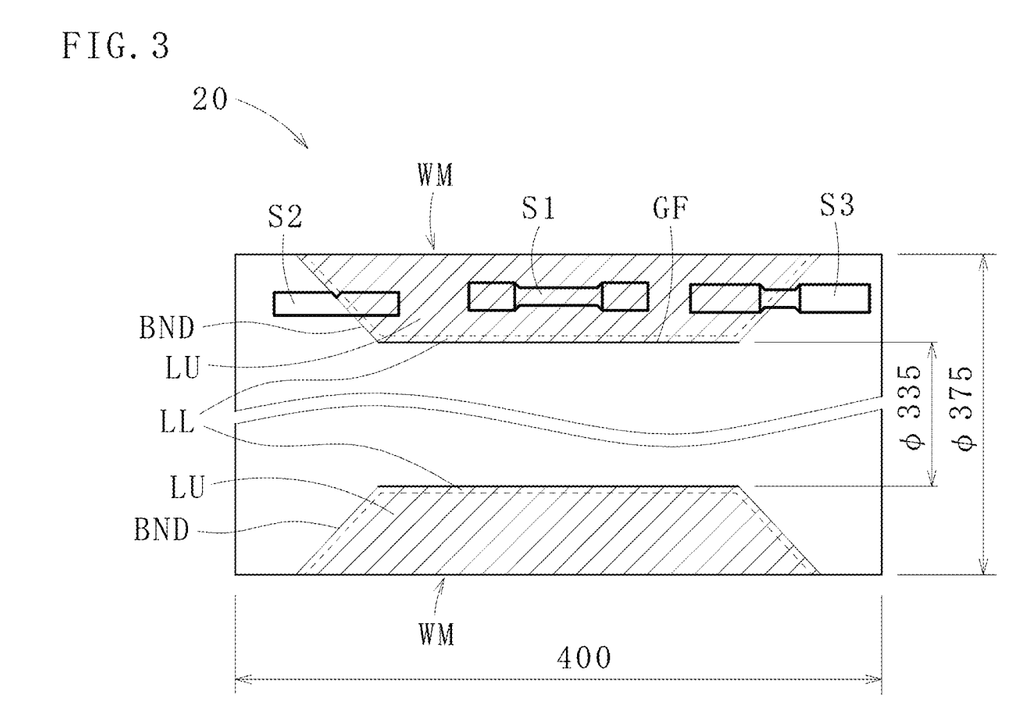
FIG. 3 is an explanatory diagram for a test material of the 9 to 12% Cr steel turbine rotor produced by the same production method.

First, a test material 20 corresponding to a journal part of an 11% Cr steel turbine rotor as shown in FIG. 3 was produced. The outside diameter of the test material 20 as the journal part is 375 mm. The length of the test material 20 is 400 mm. The method for producing a test material is as follows.

The outer peripheral surface of the test material 20 was processed by cutting to have a diameter of 335 mm to thereby form a groove face GF. A monolayer was welded on the groove face GF by a submerged arc welding method to form a lower build-up layer LL, and on the upper side of the lower build-up layer LL, multilayer build-up welding was conducted up to the previous outer peripheral surface before cutting, to form an upper build-up layer LU.

A plurality of test materials 20 were produced using various welding materials, and test materials 20 corresponding respectively to test numbers 1 to 13 were prepared.

Concretely, regarding test numbers 1 to 4, the first welding materials having different compositions were used as a welding material for lower build-up layer, and the second welding materials having different compositions were used as a welding material for upper build-up layer.

Regarding test numbers 5 to 8, as a welding material for lower build-up layer, the first welding materials having different compositions were used, and as a welding material for upper build-up layer, the identical first welding material was used.

Regarding test numbers 9 to 13, as a welding material for lower build-up layer and a welding material for upper build-up layer, a welding material that is different from the first and the second welding materials was used.

For each test number, a composition of weld deposited metal WM added by welding from the welding material for lower build-up layer and the welding material for upper build-up layer is shown in Table 1.

Regarding test numbers 1 to 4, as a composition of the weld deposited metal WM, V is added to the lower build-up layer, and V is not added to the upper build-up layer.

Regarding test numbers 5 to 8, as a composition of the weld deposited metal WM, V is added to the lower build-up layer, and V is added also to the upper build-up layer.

Regarding test numbers 9 to 13 which are comparative examples, a composition of the weld deposited metal WM departs from the compositions of the first and the second welding materials.

TABLE 1

| No. | | welding material | chemical components (weight %) | | | | | | | | |
|---|---|---|---|---|---|---|---|---|---|---|---|
| | | | C | Si | Mn | Ni | Cr | Mo | V | P | S |
| 1 | this embodiment | for lower build-up | 0.10 | 0.65 | 2.10 | 0.95 | 2.50 | 0.25 | 0.08 | 0.010 | 0.003 |
| | | for upper build-up | 0.10 | 0.65 | 2.10 | 0.95 | 2.50 | 0.25 | — | 0.010 | 0.003 |
| 2 | this embodiment | for lower build-up | 0.19 | 0.33 | 1.25 | 0.50 | 1.80 | 0.90 | 0.05 | 0.005 | 0.002 |
| | | for upper build-up | 0.19 | 0.33 | 1.25 | 0.50 | 1.80 | 0.90 | — | 0.005 | 0.002 |
| 3 | this embodiment | for lower build-up | 0.23 | 0.25 | 1.10 | 0.45 | 1.60 | 0.45 | 0.04 | 0.008 | 0.004 |
| | | for upper build-up | 0.23 | 0.25 | 1.10 | 0.45 | 1.60 | 0.45 | — | 0.008 | 0.004 |
| 4 | this embodiment | for lower build-up | 0.20 | 0.40 | 1.89 | 0.49 | 2.10 | 1.25 | 0.06 | 0.004 | 0.007 |
| | | for upper build-up | 0.20 | 0.40 | 1.89 | 0.49 | 2.10 | 1.25 | — | 0.004 | 0.007 |
| 5 | this embodiment | for lower build-up | 0.10 | 0.65 | 2.10 | 0.95 | 2.50 | 0.25 | 0.08 | 0.010 | 0.003 |
| | | for upper build-up | 0.10 | 0.65 | 2.10 | 0.95 | 2.50 | 0.25 | 0.08 | 0.010 | 0.003 |
| 6 | this embodiment | for lower build-up | 0.19 | 0.33 | 1.25 | 0.50 | 1.80 | 0.90 | 0.05 | 0.005 | 0.002 |
| | | for upper build-up | 0.19 | 0.33 | 1.25 | 0.50 | 1.80 | 0.90 | 0.05 | 0.005 | 0.002 |

TABLE 1-continued

| No. | | welding material | chemical components (weight %) | | | | | | | | |
|---|---|---|---|---|---|---|---|---|---|---|---|
| | | | C | Si | Mn | Ni | Cr | Mo | V | P | S |
| 7 | this embodiment | for lower build-up | 0.23 | 0.25 | 1.10 | 0.45 | 1.60 | 0.45 | 0.04 | 0.008 | 0.004 |
| | | for upper build-up | 0.23 | 0.25 | 1.10 | 0.45 | 1.60 | 0.45 | 0.04 | 0.008 | 0.004 |
| 8 | this embodiment | for lower build-up | 0.20 | 0.40 | 1.89 | 0.49 | 2.10 | 1.25 | 0.06 | 0.004 | 0.007 |
| | | for upper build-up | 0.20 | 0.40 | 1.89 | 0.49 | 2.10 | 1.25 | 0.06 | 0.004 | 0.007 |
| 9 | comparative example | all layers | 0.06 | 0.45 | 0.70 | 0.50 | 2.25 | 1.00 | — | 0.025 | 0.006 |
| 10 | comparative example | all layers | 0.30 | 0.60 | 0.80 | 0.40 | 1.50 | 0.30 | 0.02 | 0.008 | 0.015 |
| 11 | comparative example | all layers | 0.12 | 0.25 | 3.0 | 0.50 | 2.26 | 0.90 | 0.05 | 0.020 | 0.007 |
| 12 | comparative example | all layers | 0.08 | 0.40 | 0.60 | 1.50 | 1.60 | 0.93 | 0.15 | 0.007 | 0.003 |
| 13 | comparative example | all layers | 0.19 | 0.33 | 1.25 | 0.50 | 1.80 | 0.90 | — | 0.005 | 0.002 |

Each produced test material 20 was subjected to a stress removing heat treatment at 640° C. for 15 hours. Then from the positions shown in FIG. 3, a build-up weld metal part tensile test piece S1, a bond part boundary impact test piece S2, and a rotary bending fatigue test piece S3 were sampled. The build-up weld metal part tensile test piece S1 and the rotary bending fatigue test piece S3 include a boundary of the bond part BND.

For each of the test pieces S1 to S3, a normal temperature tensile test, a bond impact test and a fatigue test were conducted.

An acceptance criterion in the normal temperature tensile test is 0.2% proof stress of 550 MPa or more, and tensile strength of 650 MPa or more.

An acceptance criterion in the bond impact test is absorption energy at normal temperature of 25 J or more.

An acceptance criterion in the fatigue test is a fatigue limit stress in $1 \times 10^7$ cycles in the rotary bending fatigue test of 400 MPa or more.

Results of various tests are shown in Table 2. In Table 2, for each test, the test piece that is accepted is indicated by "pass". The test piece that is not accepted is indicated by "fail".

TABLE 2

| No. | | result of weld metal part tensile test | | | result of bond part impact test | | result of fatigue test | | overall judgement |
|---|---|---|---|---|---|---|---|---|---|
| | | 0.2% proof stress (MPa) | tensile strength (MPa) | judgement | vE20 (J) | judgement | fatigue limit stress (MPa) | judgement | |
| 1 | this embodiment | 571 | 684 | pass | 35 | pass | 410 | pass | pass |
| 2 | this embodiment | 576 | 683 | pass | 60 | pass | 475 | pass | pass |
| 3 | this embodiment | 614 | 733 | pass | 40 | pass | 430 | pass | pass |
| 4 | this embodiment | 581 | 696 | pass | 30 | pass | 450 | pass | pass |
| 5 | this embodiment | 573 | 682 | pass | 52 | pass | 400 | pass | pass |
| 6 | this embodiment | 599 | 717 | pass | 42 | pass | 410 | pass | pass |
| 7 | this embodiment | 631 | 750 | pass | 45 | pass | 460 | pass | pass |
| 8 | this embodiment | 583 | 698 | pass | 32 | pass | 450 | pass | pass |
| 9 | comparative example | 473 | 610 | fail | 15 | fail | 300 | fail | fail |
| 10 | comparative example | 562 | 665 | pass | 10 | fail | 350 | fail | fail |
| 11 | comparative example | 625 | 741 | pass | 12 | fail | 400 | pass | fail |
| 12 | comparative example | 541 | 645 | fail | 25 | pass | 400 | pass | fail |
| 13 | comparative example | 574 | 680 | pass | 17 | fail | 375 | fail | fail |

As shown in Table 2, test numbers 1 to 4 and test numbers 5 to 8 which are embodiments of the present invention satisfied the criteria in every characteristics including tensile strength of the weld deposited metal, bond toughness, and fatigue strength.

On the other hand, test numbers 9 to 13 which are comparative examples failed to satisfy the criteria for at least one of the characteristics including tensile strength of the weld deposited metal, bond toughness, and fatigue strength.

Figure 4:
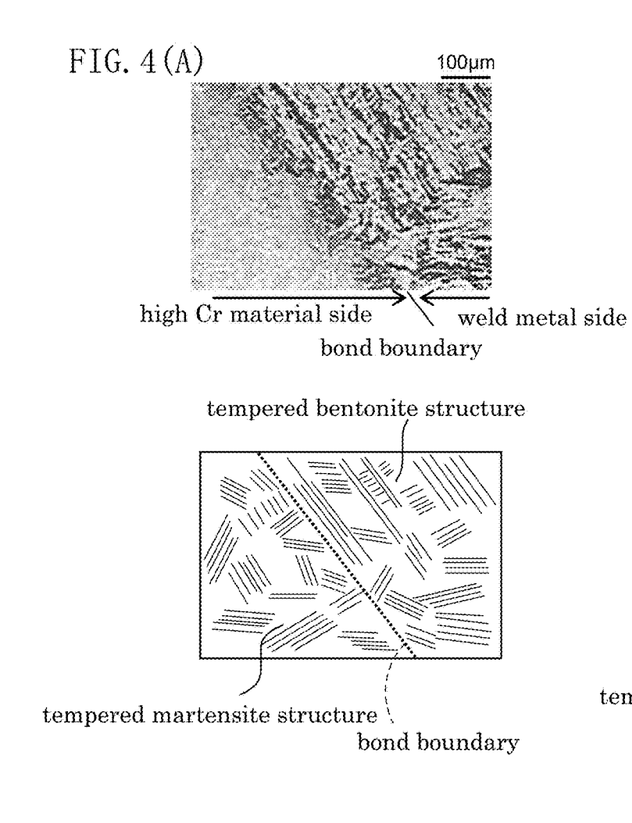
FIG. 4A shows a microscopic photograph for test number 2 and its explanatory diagram.
FIG. 4B shows a microscopic photograph for test number 13 and its explanatory diagram.

Next, a microscopic structure photograph in the vicinity of the bond of the test material (upper diagram in FIG. 4B) and an explanatory diagram thereof (lower diagram in FIG. 4B) for test number 13 which is a comparative example, and a microscopic structure photograph in the vicinity of the bond of the test material (upper diagram in FIG. 4A) and an explanatory diagram thereof (lower diagram in FIG. 4A) for test number 2 which is the present embodiment will be described.

When V is not added to the welding material for lower build-up layer as is the case of the test material of test number 13, in the first lower build-up layer, a high Cr zone occurs on the side of weld metal of the bond boundary due to dilution of Cr on the high Cr rotor base material side, and C of weld metal matrix is deposited as Cr carbide by a stress removing heat treatment. As a result, C in the metal matrix decreases, and ferrite structure is generated (see FIG. 4B).

However, when V is added to the welding material for lower build-up layer as is the case of the test material of test number 2, V carbide is deposited dominantly to Cr carbide on the weld metal side of the bond boundary due to the stress removing heat treatment. Therefore, generation of ferrite tissue is suppressed, and uniform tempered martensite structure and bainite structure are obtained (see FIG. 4A).

As is apparent from the present embodiment, the build-up-welded journal part J of the 9 to 12% Cr steel turbine rotor exhibits high 0.2% proof stress, high tensile strength, and high impact value and fatigue strength of the bond part of build-up welding.

As described above, according to the production method according to the present embodiment, it is possible to increase the strength of the deposited metal welded to the journal part, and to provide a 9 to 12% Cr steel turbine rotor with improved fatigue characteristic and bond toughness of the bond part.

Figure 1:
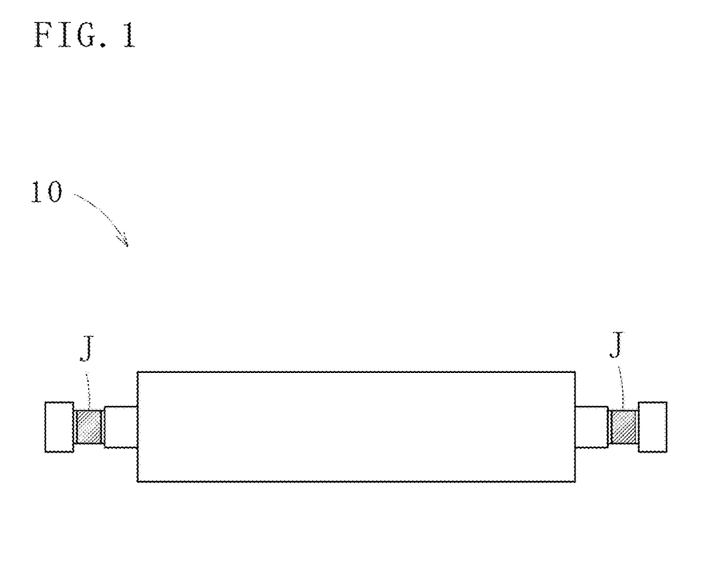
FIG. 1 is a view showing a profile of a turbine rotor produced by a method for producing a 9 to 12% Cr steel turbine rotor according to one embodiment of the present invention.

Therefore, the 9 to 12% Cr steel turbine rotor 10 produced by the production method according to the present embodiment has such a long service life that is durable to long-time operation as a steam turbine rotor in an already operating thermal power station. Further, for example, the 9 to 12% Cr steel turbine rotor 10 is applicable to a steam turbine that is used under operation conditions of high temperature and high pressure.

The present invention is not limited to the above embodiment, and may be modified without departing from the subject matter of the present invention. For example, the case of constituting the invention by partly or entirely combining the above-described embodiments and modified embodiments is also included in the technical scope of the present invention.

DESCRIPTION OF NUMERALS

10: 9 to 12% Cr steel turbine rotor, 20: test material, BND: bond part, GF: groove face, J: journal part, LL: lower build-up layer, LU: upper build-up layer, S1: build-up weld metal part tensile test piece, S2: bond part boundary impact test piece, S3: rotary bending fatigue test piece, WM: weld deposited metal

What is claimed is:

1. A method for producing a 9 to 12 wt % Cr steel turbine rotor comprising:
    a first step of forming a groove face in a region corresponding to a journal part of the 9 to 12 wt % Cr steel turbine rotor;
    a second step of forming, on the groove face, a lower build-up layer by monolayer build-up welding using a first welding material consisting of C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, V: 0.04 to 0.08 wt % excluding 0.04 wt %, and a remainder composed of Fe and inevitable impurities including P: 0.015 wt % or less and S: 0.010 wt % or less;
    a third step of forming, on the lower build-up layer, an upper build-up layer by multilayer build-up welding using a second welding material consisting essentially of C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, and a remainder composed of Fe and inevitable impurities including P: 0.015 wt % or less and S: 0.010 wt % or less; and
    a fourth step of conducting a stress removing heat treatment on the journal part formed with the upper build-up layer,
    wherein V is contained in the % by weight in the first welding material for welding the lower build-up layer, to suppress generation of a ferrite structure in deposited metal in the vicinity of a bond part after removal of stress, and to promote generation of uniform tempered martensite structure and bainite structure.

2. The method for producing a 9 to 12 wt % Cr steel turbine rotor according to claim 1, wherein Mn contained in the first welding material ranges from 1.25 to 2.5 wt %.

3. The method for producing a 9 to 12 wt % Cr steel turbine rotor according to claim 1, wherein after the stress removing heat treatment in the fourth step, a machining process is conducted, and further a rolling process is conducted on the part where the stress removing heat treatment is conducted.

4. A method for producing a 9 to 12 wt % Cr steel turbine rotor comprising:
    a first step of forming a groove face in a region corresponding to a journal part of the 9 to 12 wt % Cr steel turbine rotor;
    a second step of forming, on the groove face, a lower build-up layer by monolayer build-up welding using a first welding material consisting of C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, V: 0.04 to 0.08 wt % excluding 0.04 wt %, and a remainder composed of Fe and inevitable impurities including P: 0.015 wt % or less and S: 0.010 wt % or less;
    a third step of forming, on the lower build-up layer, an upper build-up layer by multilayer build-up welding using a second welding material consisting essentially of C: 0.10 to 0.25 wt %, Si: 0.20 to 0.80 wt %, Mn: 1.0 to 2.5 wt %, Ni: 0.4 to 1.0 wt %, Cr: 1.0 to 3.0 wt %, Mo: 0.2 to 1.5 wt %, V: 0.04 to 0.08 wt % excluding 0.04 wt %, and a remainder composed of Fe and inevitable impurities including P: 0.015 wt % or less and S: 0.010 wt % or less; and a fourth step of conducting a stress removing heat treatment on the journal part formed with the upper build-up layer, wherein V is contained in the % by weight in the first welding material for welding the lower build-up layer, to suppress generation of a ferrite structure in deposited metal in the vicinity of a bond part after removal of stress, and to promote generation of uniform tempered martensite structure and bainite structure.

* * * * *